(12) United States Patent
Sullivan

(10) Patent No.: US 7,015,945 B1
(45) Date of Patent: *Mar. 21, 2006

(54) VIDEO SURVEILLANCE SYSTEM AND METHOD

(75) Inventor: Patrick J. Sullivan, Plano, TX (US)

(73) Assignee: Visilinx Inc., Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 955 days.

(21) Appl. No.: 08/677,513

(22) Filed: Jul. 10, 1996

(51) Int. Cl.
*H04N 7/18* (2006.01)
(52) U.S. Cl. ...................... 348/150; 348/161
(58) Field of Classification Search ........ 348/143–168, 348/12–15; 395/187.01; 382/116, 118, 119; 345/327, 329, 330
See application file for complete search history.

(56) References Cited

U.S. PATENT DOCUMENTS

| | | | |
|---|---|---|---|
| 4,054,752 A | 10/1977 | Dennis, Jr. et al. | 179/5 R |
| 4,120,004 A | 10/1978 | Coutta | 348/143 |
| 4,141,006 A | 2/1979 | Braxton | 340/505 |
| 4,145,715 A | 3/1979 | Clever | 348/143 |
| 4,237,483 A | 12/1980 | Clever | 348/143 |
| 4,326,221 A | 4/1982 | Mallos et al. | 348/143 |
| 4,337,482 A | 6/1982 | Coutta | 348/143 |
| 4,511,886 A | 4/1985 | Rodriguez | 340/534 |
| 4,630,110 A | 12/1986 | Cotton et al. | 348/143 |
| 4,845,636 A | 7/1989 | Walker | 364/479 |
| 4,942,464 A | 7/1990 | Milatz | 348/150 |
| 4,943,854 A | 7/1990 | Shiota et al. | 348/143 |
| 4,991,008 A | 2/1991 | Nama | 348/143 |
| 5,053,868 A | 10/1991 | Higgins et al. | 348/150 |
| 5,109,278 A | 4/1992 | Erickson et al. | 348/143 |
| 5,111,291 A | 5/1992 | Erickson et al. | 348/143 |
| 5,128,755 A | 7/1992 | Fancher | 348/143 |
| 5,164,979 A | 11/1992 | Choi | 379/40 |
| 5,189,607 A | 2/1993 | Shirasaki et al. | 364/405 |
| 5,216,502 A | 6/1993 | Katz | 348/150 |
| 5,237,408 A | 8/1993 | Blum et al. | 348/143 |
| 5,375,068 A | 12/1994 | Palmer et al. | 364/514 |
| 5,382,943 A | 1/1995 | Tanaka | 340/539 |
| 5,384,588 A | 1/1995 | Martin et al. | 348/15 |
| 5,396,269 A * | 3/1995 | Gotoh et al. | 348/14 |
| 5,398,057 A | 3/1995 | Tapp | 348/154 |
| 5,406,324 A | 4/1995 | Roth | 348/22 |
| 5,420,405 A | 5/1995 | Chasek | 235/379 |
| 5,448,290 A | 9/1995 | VanZeeland | 348/153 |

(Continued)

FOREIGN PATENT DOCUMENTS

EP  0332161  3/1989

(Continued)

OTHER PUBLICATIONS

"American Video Equipment" Product Catalog, *American Video Equipment*, 1995, 63 pages.

(Continued)

*Primary Examiner*—Andy Rao
(74) *Attorney, Agent, or Firm*—Baker Botts L.L.P.

(57) ABSTRACT

A video surveillance system (10) includes clients (12) coupled to servers (20) using a network (24). The clients (12) generate digital files (14) that may include data (82), video (72), and audio (74). Using the network (24), the clients (12) communicate the digital files (14) to the servers (20) for monitoring, analyzing, and reporting on the financial transactions occurring at the clients (12). The video surveillance system (10) also supports one-way or two-way audio/video conferencing between the clients (12) and the servers (20) using the network (24).

25 Claims, 5 Drawing Sheets

U.S. PATENT DOCUMENTS

| | | | | |
|---|---|---|---|---|
| 5,485,142 | A | | 1/1996 | Stute et al. ............... 340/506 |
| 5,491,511 | A | | 2/1996 | Odle ...................... 348/153 |
| 5,493,638 | A | | 2/1996 | Hooper et al. ........... 395/135 |
| RE35,184 | E | | 3/1996 | Walker .................... 364/479 |
| 5,508,500 | A | | 4/1996 | Martin et al. ............ 235/381 |
| 5,508,737 | A | | 4/1996 | Lang ....................... 348/159 |
| 5,509,009 | A | | 4/1996 | Laycock et al. ........... 370/62 |
| 5,512,942 | A | | 4/1996 | Otsuki ..................... 348/143 |
| 5,521,634 | A | | 5/1996 | McGary .................. 348/169 |
| 5,602,933 | A | * | 2/1997 | Blackwell et al. ........ 348/143 |
| 5,619,183 | A | * | 4/1997 | Ziegra et al. ............. 348/143 |
| 5,644,727 | A | * | 7/1997 | Atkins ..................... 705/40 |
| 5,699,107 | A | * | 12/1997 | Lawler et al. ............ 348/13 |
| 5,699,472 | A | * | 12/1997 | Ueda ....................... 348/13 |
| 5,751,339 | A | * | 5/1998 | Aramaki et al. .......... 348/17 |
| 5,784,610 | A | * | 7/1998 | Copeland et al. ......... 707/10 |
| 5,790,178 | A | * | 8/1998 | Shibata et al. ............ 348/15 |
| 5,870,725 | A | * | 2/1999 | Bellinger et al. .......... 705/45 |
| 5,889,863 | A | * | 3/1999 | Weber ..................... 380/25 |
| 5,929,897 | A | * | 7/1999 | Schneider et al. ......... 348/15 |
| 5,973,731 | A | * | 10/1999 | Schwab ................... 348/161 |

FOREIGN PATENT DOCUMENTS

EP    0661677    7/1995

OTHER PUBLICATIONS

"The Mole-DVR™" Advertising Brochure, *Prism Video, Inc.*, Date Unknown, 2 pages.

"The Mole™ 2000" Advertising Brochure, *Prism Video, Inc.*, Date Unknown, 2 pages.

"How Can A Device This Small Make Such A Huge Contribution To Your Security System?" TVX™ Advertising Brochure, *Time Alarm Systems Inc.*, Date Unknown, 4 pages.

"Remote-PICS T6000 Remote Image Transmitter" Advertising Brochure, *Presearch Incorporated*, 1994, 2 pages.

"Remote-PICS R8000 Digital Image Receiver" Advertising Brochure, *Presearch Incorporated*, 1994, 2 pages.

"HYPERSCAN® ULTRA" Advertising Brochure, *Sensormatic Electronics Corporation*, 1996, 2 pages.

"RapidEye 3.0" Advertising Brochure, *Dedicated Technologies Corporation*, 1994, 4 pages.

"Rapid Eye Remote Video and Digital Recording" Advertising Brochure, *AIT Corporation*, Aug. 1995, 5 pages.

"LANEX" Advertising Brochure, *LANEX*, Date Unknown, 1 page.

"TVS Video Text Systems" Advertising Brochure, *Transaction Verification Systems, Inc.*, Date Unknown, 4 pages.

"NAVCO" Advertising Brochure, *NAVCO Security Systems*, 1994, 13 pages.

* cited by examiner

VIDEO SURVEILLANCE SYSTEM AND METHOD

TECHNICAL FIELD OF THE INVENTION

This invention relates in general to surveillance and communication systems, and more specifically to a video surveillance system and method.

BACKGROUND OF THE INVENTION

A point-of-sale (POS) device, an automated teller machine (ATM), or other similar device generates data associated with a financial transaction. For example, a POS device may generate data associated with the sale of an item, whereas an ATM may generate data associated with a cash withdrawal by a customer. Due to human error, intentional misconduct, or machine malfunction, there may be a desire to display or analyze events associated with these financial transactions.

Existing surveillance systems provide some monitoring of financial transactions. For example, some surveillance systems capture data associated with financial transactions for later analysis and reporting. Other surveillance systems store video images on videotape for later visual analysis and reporting of the event. Still other systems associate or overlay financial transaction data with video stored on videotape.

SUMMARY OF THE INVENTION

In accordance with the present invention, the disadvantages and problems associated with surveillance systems have been substantially reduced or eliminated. In particular, the present invention provides a video surveillance system and method that combines data, video, and optionally audio associated with a financial transaction in a digital file. A server retrieves the digital file from the client and provides a graphical interface to retrieve the data, video, and optionally audio from the digital file for presentation and analysis.

In accordance with one embodiment of the present invention, a video surveillance system includes a client that generates data associated with a financial transaction. The client has a camera that generates video associated with the financial transaction. The client stores data and video in a digital file. A server is coupled to the client using a communications network and receives the digital file from the client and stores the digital file in a memory. The server has a graphical interface that retrieves data and video from the digital file stored in the memory for presentation.

Important technical advantages of the present invention include the storage of data, video, and optionally audio associated with a financial transaction in a digital file. In particular, a client, such as a point-of-sale (POS) device like a cash register or an automated teller machine (ATM), generates data associated with and upon the occurrence of a financial transaction. The client also includes a camera that generates associated video and optionally a microphone that generates associated audio. The client may store data, video, and audio in a single multimedia digital file. In a particular embodiment, the client includes two modes of operation. In the first mode, the client includes only data associated with the financial transaction in the digital file. In the second mode associated with an exception condition of the financial transaction, the client includes data, video, and optionally audio in the digital file. The exception condition may be defined by information transmitted from the server.

The storage of different information into a digital file provides several important technical advantages. The digital file may be formatted, compressed, and communicated using digital communications technology. The digital file may be scrambled, rearranged, encoded, or otherwise processed to prevent tampering or disassociation of data, video, and audio. Also, a digital file format allows more sophisticated database storage, retrieval, and reporting functions.

Another important technical advantage of the present invention includes a server coupled to the client that retrieves the digital file. The server includes a graphical interface that allows a user of the server to display, analyze, and generate reports on information contained in the digital file. In a particular embodiment, the server is coupled to a plurality of clients, and each client generates digital files for financial transactions occurring at the client. The server collects and stores these digital files in a database. The graphical interface accesses the database to allow selection, presentation, analysis, and reporting of the financial transactions represented by the digital files. In a particular embodiment, data for each financial transaction appears as an entry in a table of financial transactions. Highlighted entries may indicate the existence of video associated with the data. The graphical interface may also include a video window for viewing associated video and a search/report window to allow selection and analysis of financial transactions. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following written description taken in conjunction with the accompanying drawings, in which.

DETAILED DESCRIPTION OF THE INVENTION

Figure 1:
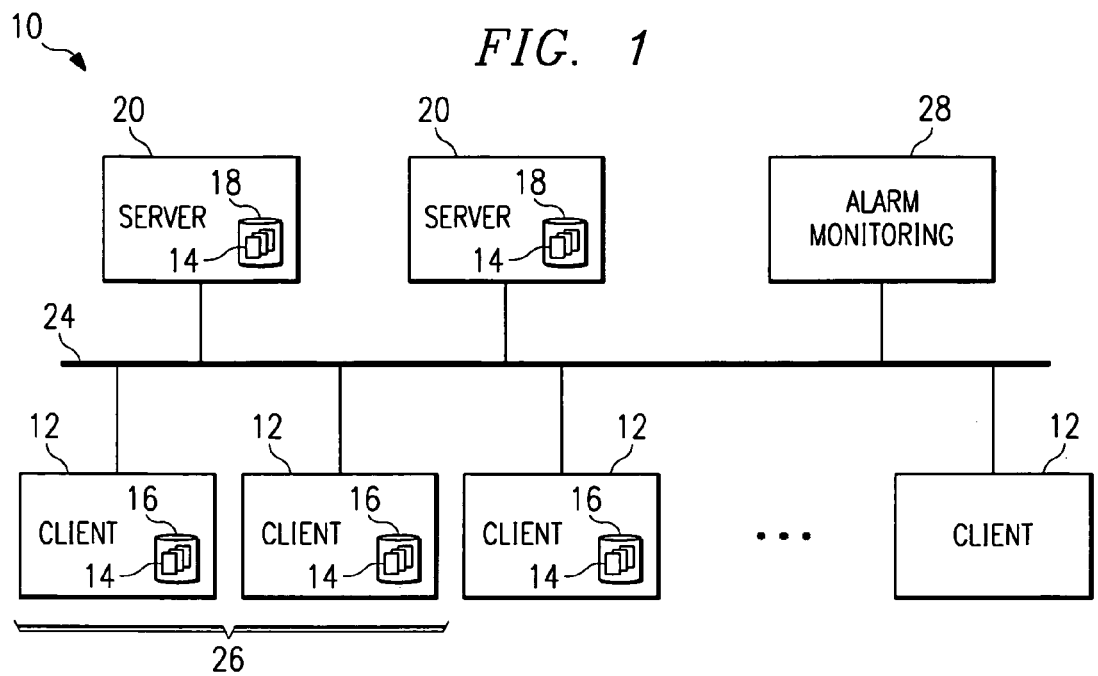
FIG. 1 illustrates a video surveillance system.

FIG. 1 illustrates a video surveillance system 10 that includes clients 12 coupled to servers 20 using a communications network 24. In operation, clients 12 generate digital files 14 that include data, video, and optionally audio associated with financial transactions. Clients 12 communicate digital files 14 to servers 20 using network 24. Servers 20 store digital files 14 received from clients 12 in databases 18, and provide remote monitoring, reporting, and analysis of financial transactions occurring at clients 12.

Clients 12 may include or be associated with any electronic device that generates data on a financial transaction, such as a point-of-sale (POS) device like a cash register, automated teller machine (ATM), or any other appropriate device that generates data on a financial transaction. Clients 12 may be located at one or more sites, associated with one or more business organizations, or otherwise arranged or grouped in any appropriate manner. For example, two or more clients 12 may be co-located at a site, operated by the same business organization, or otherwise associated as indicated by bracket 26. Each server 20 in system 10 receives digital files 14 associated with financial transactions occurring at one or more designated or associated clients 12. System 10 contemplates any association or arrangement of clients 12 and servers 20 to accomplish remote monitoring and analysis of financial transactions.

Network 24 represents hardware and software used in any suitable communications network or computer network, such as a local area network (LAN), wide area network (WAN), public switched telephone network, integrated services digital network (ISDN), switched-56 telephone network, private branch exchange (PBX), the global computer network known as the Internet, or any other appropriate technology or technique that allows components of system 10 to communicate information. Although client 12 and server 20 are referred to in the nomenclature of a client/server environment, it should be understood that client 12 and server 20 may be any type of computer operating in any suitable environment that communicates using network 24. Each component in system 10 includes any suitable hardware and software components to interface with and communicate using network 24.

In a particular embodiment, network 24 supports one-way and two-way audio/video conferencing. Throughout this description, audio/video conferencing includes conferencing of audio alone, video alone, or both audio and video, together with any associated data. For example, network 24 may include components to implement an integrated services digital network (ISDN) communications facility that supports the ITU H.320 video conferencing standard. In this embodiment, each component of system 10 may include appropriate transceivers, coders/decoders (codecs), interface cards, and other hardware and software to implement audio/video conferencing and underlying data transfer.

An alarm monitoring station 28 is also coupled to network 24 and detects alarm conditions at clients 12. In response to this detection, station 28 establishes communication with the particular client 12 that generates the alarm condition. Station 28 may display in a direct, dedicated, real-time, or near real-time fashion data, video, and audio generated at the particular client 12 that generated the alarm condition. Station 28 may also perform one-way or two-way audio/video conferencing with the particular client 12. In a particular embodiment, station 28 alerts and dispatches police, fire, security, or other officials to client 12.

In operation, clients 12 perform financial transactions and generate digital files 14 associated with the financial transactions for storage in databases 16. At appropriate times, server 20 receives digital files 14 from clients 12, and stores these digital files 14 in database 18. In one embodiment, database 18 maintained at server 20 includes digital files 14 collected from numerous clients 12. Server 20 includes a database management system and a graphical interface to display, select, analyze, and report on financial transactions occurring at clients 12 that correspond to digital files 14 maintained in database 18.

Figure 2:
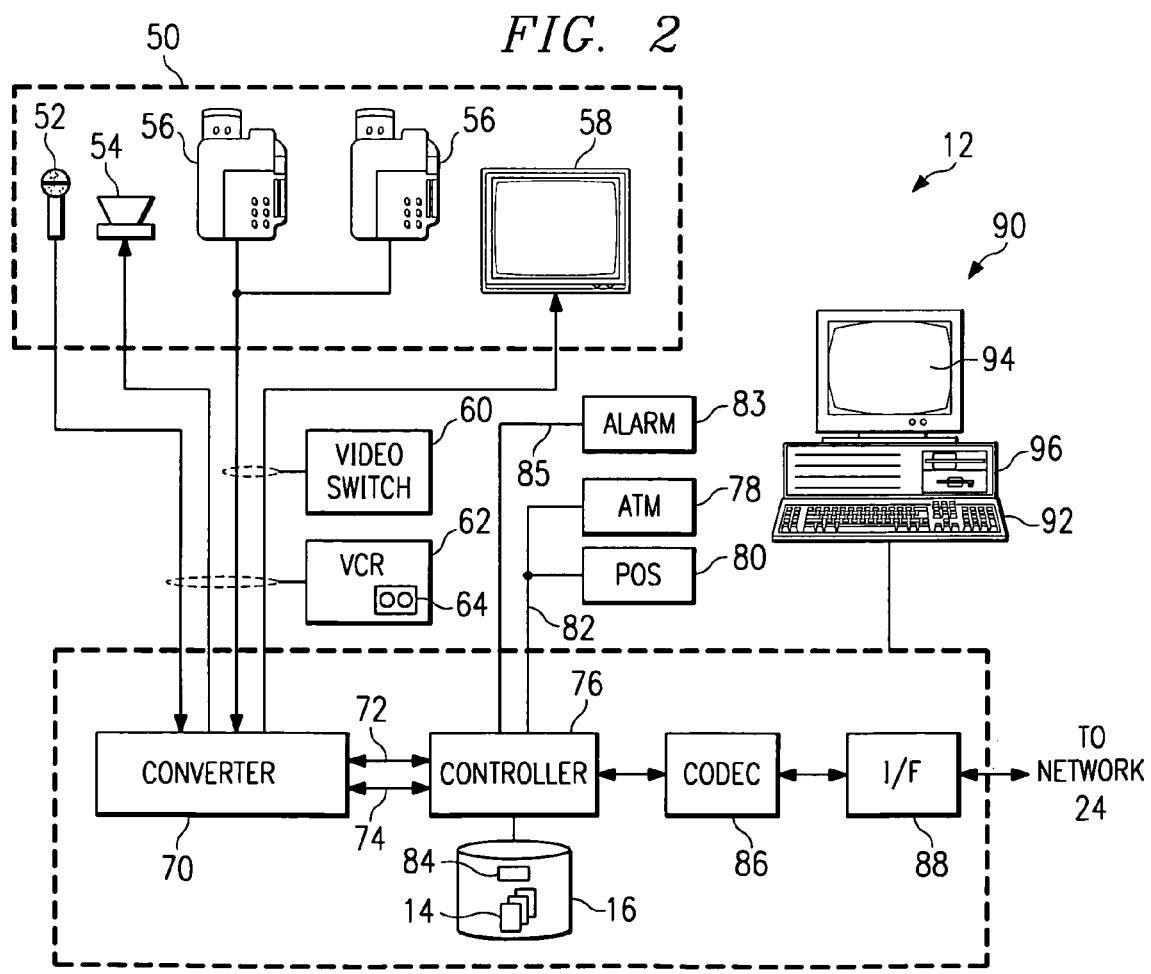
FIG. 2 illustrates a client in the video surveillance system.

FIG. 2 illustrates client 12 in more detail. On-site input/output devices 50 include microphone 52, speaker 54, cameras 56, and display 58. A video switch 60, coupled to cameras 56 and display 58, selects video from one or more cameras 56. A video cassette recorder (VCR) 62 or other appropriate recording device is coupled to input/output devices 50, and records video and audio information on videotape 64.

Input/output devices 50 are coupled to a converter 70, which passes video 72 and audio 74 in digital format to a controller 76. Controller 76 is coupled to and receives data 82 regarding a financial transaction from ATM 78, POS 80, or any other device that generates data 82 regarding a financial transaction. An alarm 83 is also coupled to controller 76, and represents a motion detector, clock, panic button, or other device that generates an alarm condition 85 at client 12.

Controller 76 is coupled to database 16 which stores digital files 14 and exception condition 84. Exception condition 84 comprises information that directs client 12 when to store video and optional audio for particular financial transactions. For example, exception condition 84 may represent one or more activities, such as keystrokes at ATM 78 or POS 80, that when detected in data 82 triggers the capture of video 72 and/or audio 74 for the financial transaction. Exception condition 84 may be defined as a noise threshold in audio 74 or a pixel or picture variance or difference threshold in video 72 that, when exceeded, triggers the capture of video 72 and audio 74. Controller 76 is also coupled to codec 86, which in turn is coupled to network 24 using interface 88.

Particular components of client 12 may operate on one or more computers, shown generally as computer 90. Computer 90 maintains and executes the instructions to implement converter 70, controller 76, codec 86, and interface 88, and includes any suitable combination of hardware and software to provide the described function or operation of these components. Database 16 comprises one or more files, lists, or other arrangement of information stored in one or more components of random access memory (RAM), read only memory (ROM), magnetic computer disk, CD-ROM, other magnetic or optical storage media, or any other volatile or nonvolatile memory.

Computer 90 includes an input device 92 such as a keypad, touch screen, mouse, or other device, that can accept information. Output device 94, such as a computer display or speaker, conveys information associated with the operation of client 12, including digital data, visual information, or audio information. Both input device 92 and output device 94 may include fixed or removable storage media such as a magnetic computer disk, CD-ROM, or other suitable media to both receive output from and provide input to client 12. Processor 96 and its associated memory execute instructions and manipulate information in accordance with the operation of client 12.

In operation, input/output devices 50 may operate in an analog or mixed analog/digital environment. For example, cameras 56 may generate and display 58 may display video in a standard television format such as NTSC or other analog signal format. Similarly, microphone 52 may generate and speaker 54 may convey audio information in analog form. If appropriate, converter 70 converts analog signals used by one or more input/output devices 50 into digital signals for video 72 and audio 74 used by controller 76. In one embodiment, input/output devices 50 generate and receive digital data and the operation of converter 70 is unnecessary.

Upon the occurrence of a financial transaction, ATM 78 or POS 80 generates data 82 associated with the financial transaction. Controller 76 analyzes video 72, audio 74, and/or data 82 to determine if it indicates, corresponds to, or is associated with exception condition 84 stored in database 16. In a first mode, controller 76 determines that video 72, audio 74, and/or data 82 are not associated with exception condition 84 and stores only data 82 generated by ATM 78 or POS 80 as digital file 14 in database 16. In a second mode, controller 76 determines that video 72, audio 74, and/or data 82 generated by ATM 78 or POS 80 is associated with exception condition 84, which triggers the capture of video 72 and optionally audio 74. Therefore, in the second mode of operation, controller 76 includes data, video 72, and optionally audio 74 associated with the financial transaction in digital file 14 stored in database 16.

Contemporaneously with the storage of digital file 14 in database 16 or at an appropriate later time, controller 76 retrieves one or more digital files 14 from database 16 for transmission to server 20 using codec 86, interface 88, and network 24. Client 12 may schedule delivery of digital files 14 to server 20 in any appropriate manner. For example, client 12 may communicate digital files 14 to server 20 at off-peak hours, at the end of a shift, at specified intervals during a day, week, or month, or at any other appropriate time, depending on the particular requirements of the business organization operating client 12. In addition, client 12 may initiate communication of digital files 14 in response to a command received from server 20 over network 24. Also, alarm condition 85 generated by alarm 83 may cause client 12 to immediately communicate digital file 14 associated with alarm condition 85. In this embodiment, client 12 may transmit alarm condition 85 to station 28 and establish a direct, dedicated, real-time, or near real-time one-way or two-way audio/video conference with station 28.

In combination with or separate from the generation and communication of digital files 14, client 12 also supports one-way and two-way audio/video conferencing using network 24. For one-way audio/video conferencing, converter 70 passes video 72 from cameras 56 and audio 74 from microphone 52 to controller 76. Controller 76 and codec 86 place video 72 and audio 74 into an appropriate format such as the video conferencing standard described in ITU H.320. Controller 76 may also include any data generated at client 12 in the conferencing information. In a particular embodiment, one-way audio/video conferencing signals are multiplexed and compressed onto a single digital bit data stream and transmitted to server 20 or station 28 using the ISDN communications standard supported by network 24.

For two-way audio/video conferencing, the components of client 12 perform the same outgoing conferencing capability, but also receive audio/video conferencing signals from server 20 using network 24, interface 88, and codec 86. Controller 76 receives incoming signals from codec 86, separates the signals, and passes video 72 and audio 74 to converter 70. Converter 70 performs conversion, if appropriate, and presents incoming conferencing signals to speaker 54 and display 58. Controller 76 may also extract data from the incoming conferencing signals.

Figure 3:
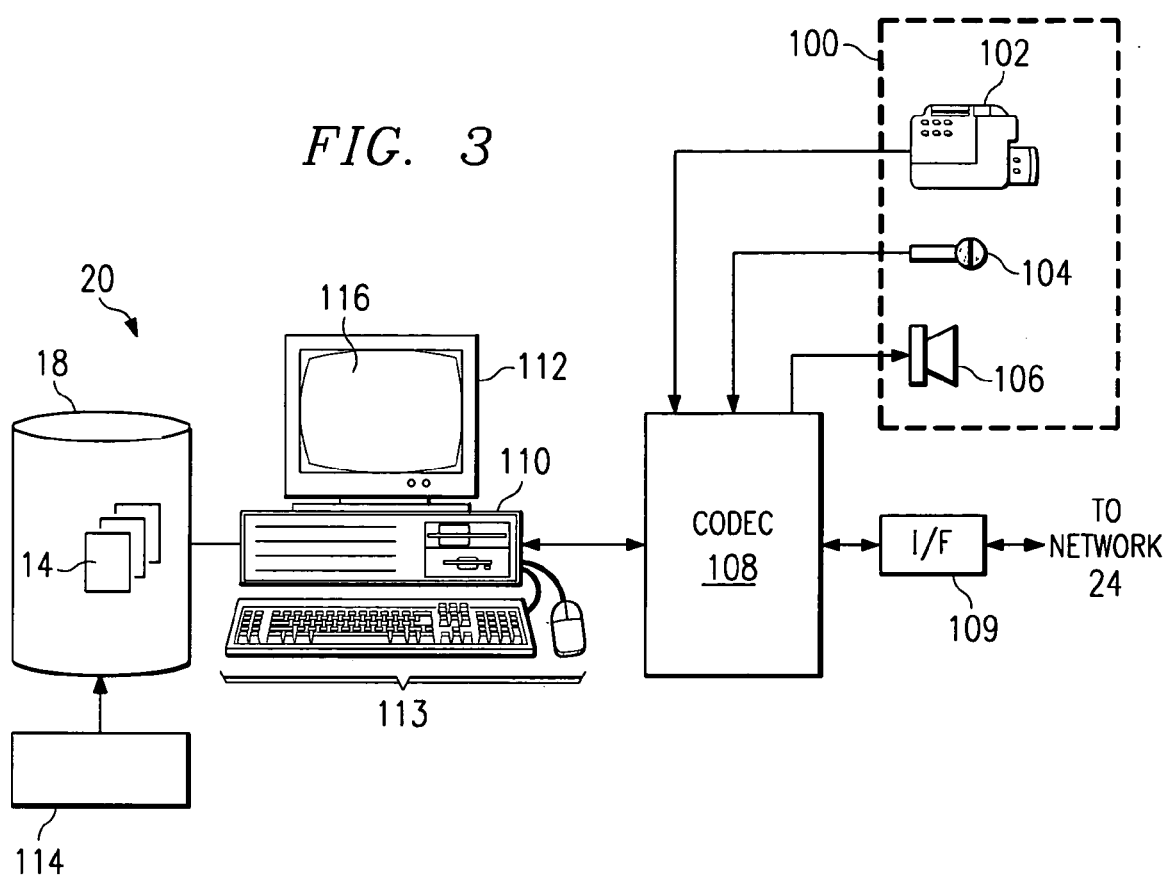
FIG. 3 illustrates a server in the video surveillance system.

FIG. 3 illustrates server 20 in more detail. Input/output devices 100 include camera 102, microphone 104, and speaker 106. Input/output devices 100 are coupled to a codec 108, which in turn is coupled to network 24 using an interface 109. A controller 110 is coupled to codec 108, display 112, and input devices 113. Display 112 displays information contained in digital files 14 received from clients 12. In particular, display 112 presents a graphical interface 116 that allows a user of server 20 to display, select, analyze, and report on financial transactions occurring at clients 12 that correspond to digital files 14 maintained in database 18. Input devices 113 may include a keyboard, mouse, other pointing device, or any other appropriate input device that allows the user to interact with graphical interface 116 and direct the operation of server 20.

Controller 110 is also coupled to database 18, which stores digital files 14 received from clients 12. Database 18 includes a database management system 114 that provides traditional database features to store, retrieve, and manipulate information stored as digital files 14 for monitoring, analyzing, and reporting on financial transactions occurring at clients 12. Database management system 114 supports any suitable flat file, hierarchical, relational, object-oriented, or parallel database operation.

In operation, server 20 receives data 82, video 72, and optionally audio 74 in the form of digital files 14 from network 24 using interface 109. Codec 108 decompresses and converts this information into a proper format for storage in database 18 by controller 110. The retrieval of digital files 14 from clients 12 may occur on a periodic basis defined by clients 12, a periodic basis defined by server 20, or as a result of server 20 polling clients 12 with commands to download information.

In response to a request from controller 110, database management system 114 accesses selected digital files 14 and passes this information to controller 110 for presentation by graphical interface 116 on display 112. Using graphical interface 116, the user can display, select, view, analyze, and report on information associated with financial transactions occurring at clients 12.

Figure 4:
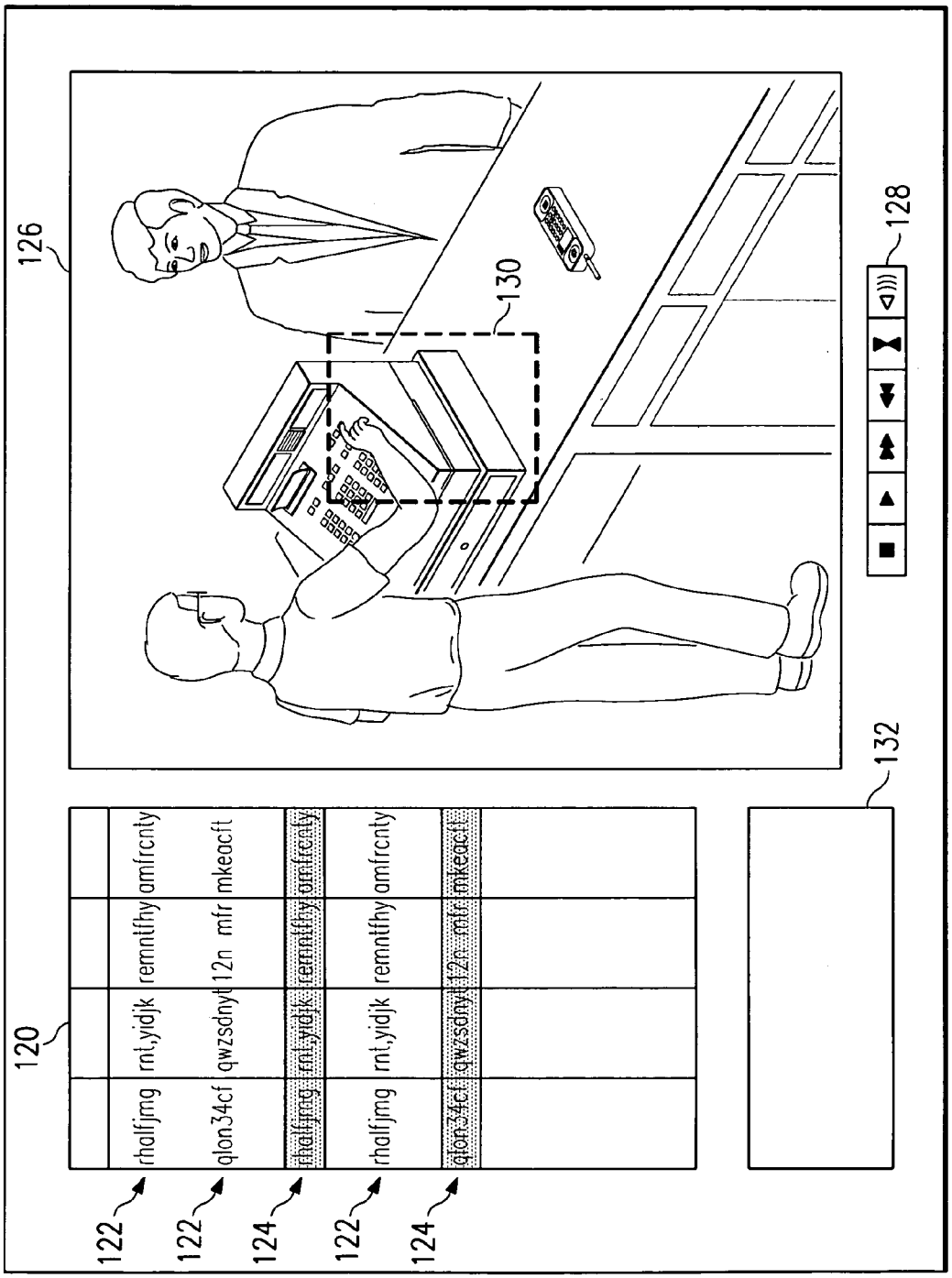
FIG. 4 illustrates a graphical interface at the server in the video surveillance system.

FIG. 4 illustrates in more detail the components of graphical interface 116. Graphical interface 116 includes a table 120 having a number of entries 122 associated with financial transactions. Each entry 122 includes all or a portion of data 82 generated by POS 78 or ATM 80 at client 12. Highlighted entries 124 may be emphasized by shading, font changes, color differences, or other appropriate technique to indicate the existence of associated video and/or audio. In a particular embodiment, entries 122 correspond to data received from clients 12 operating in a first mode in which digital file 14 includes data 82, and highlighted entries 124 correspond to information retrieved from clients 12 operating in a second mode in which digital file 14 includes data 82, video 72, and optionally audio 74. In this manner, table 120 provides data 82 on associated financial transactions, and also conveys visually those financial transactions associated with particular defined exception conditions 84 at clients 12. Highlighted entries 124 may then be quickly recognized by the user of server 20 and analyzed as a suspect or more closely monitored financial transaction.

Upon a user selecting highlighted entry 124 using input device 113, video window 126 presents a still frame or a selected portion of partial or full motion video 72 associated with the selected highlighted entry 124. Optional audio 74 may also be presented simultaneously with video 72. The user may manipulate a toolbar 128 to play, pause, stop, fast forward, rewind, adjust the volume, or perform other appropriate functions to analyze video 72 and audio 74 presented by graphical interface 116. Furthermore, video window 126 may present a magnification box 130 that allows the user to analyze selected portions of video 72 in more detail using zoom, pan, and other functions. The storage of vide 72 and audio 74 as digital information enables more sophisticated analysis techniques, such as the techniques provided by toolbar 128 and magnification box 130.

Graphical interface 116 also includes a search/report window 132 that allows the user of server 20 to specify particular financial transactions to view in table 120. For example, search/report window 132 may prompt the user for a number of parameters that specify the desired financial transactions to view. Parameters may include time, date, store identifier, register identifier, amount of transaction, all transactions involving a particular item, all transactions meeting an exception condition, or any other appropriate parameter. Search/report window 132 may also include various printing, reporting, and analyzing capabilities of server 20.

Figure 5:
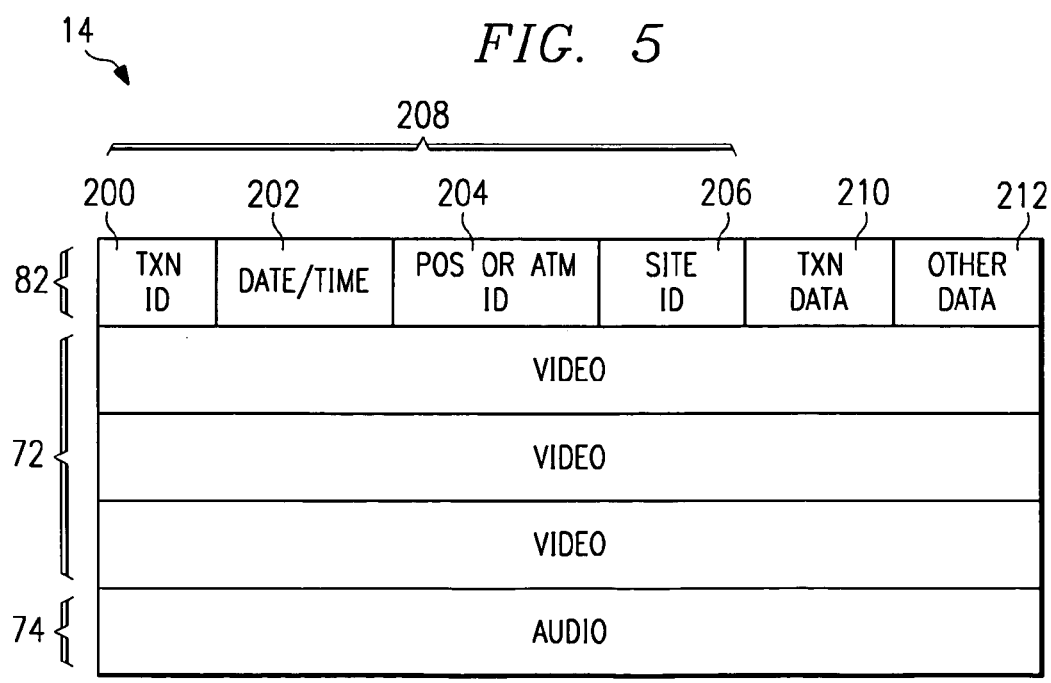
FIG. 5 illustrates the components of an exemplary digital file used in the video surveillance system.

FIG. 5 illustrates digital file 14 generated by client 12, optionally stored in database 16 at client 12, and stored in database 18 at server 20. Digital file 14 includes data 82 generated by ATM 78 or POS 80 at client 12, video 72, and audio 74. As described above, client 12 operating in a first mode in which exception condition 84 is not met may only include data 82 in digital file 14. However, in a second mode in which exception condition 84 is met, client 12 may include data 82, video 72, and optionally audio 74 in digital file 14.

Data 82 includes a transaction identifier 200, date and time 202, POS or ATM identifier 204, and site identifier 206, which may all be considered together as identifiers 208 that uniquely specify digital file 14 in system 10. Data 82 also includes transaction data 210, that may specify transaction type, item identification, item cost, taxable amount, amount tendered, tax added, total, withdrawal amount, account information, user information, keys depressed at ATM 78 or POS 80 during the financial transaction, or any other data associated with the financial transaction. Controller 76 at client 12 may analyze transaction data 210 to determine if exception condition 84 is met. Data 82 may also include other data 212, such as a measure of the time the cash register door is open, an identifier of the employee on duty, an estimate of the number of persons in the store, or other information not directly related to the financial transaction but provided in data 82 for further analysis of the financial transaction. For clarity, digital file 14 in FIG. 5 arranges information in blocks. However, data 82, video 72, and audio 74 may be arranged in any format or order, depending upon the particular implementation and technology used in system 10.

The maintenance of data 82, video 72, and audio 74 in a single digital file 14 provides several technical advantages. Digital file 14 may be scrambled, rearranged, encoded, or otherwise processed to prevent tampering or disassociation of data 82 with its corresponding video 72 and audio 74. In addition, system 10 capitalizes on digital storage, compression, and communications techniques to quickly and efficiently gather digital information at server 20. Also, the digital format of digital file 14 enables more sophisticated database storage, retrieval, and reporting functions to be performed at server 20.

Figure 6:
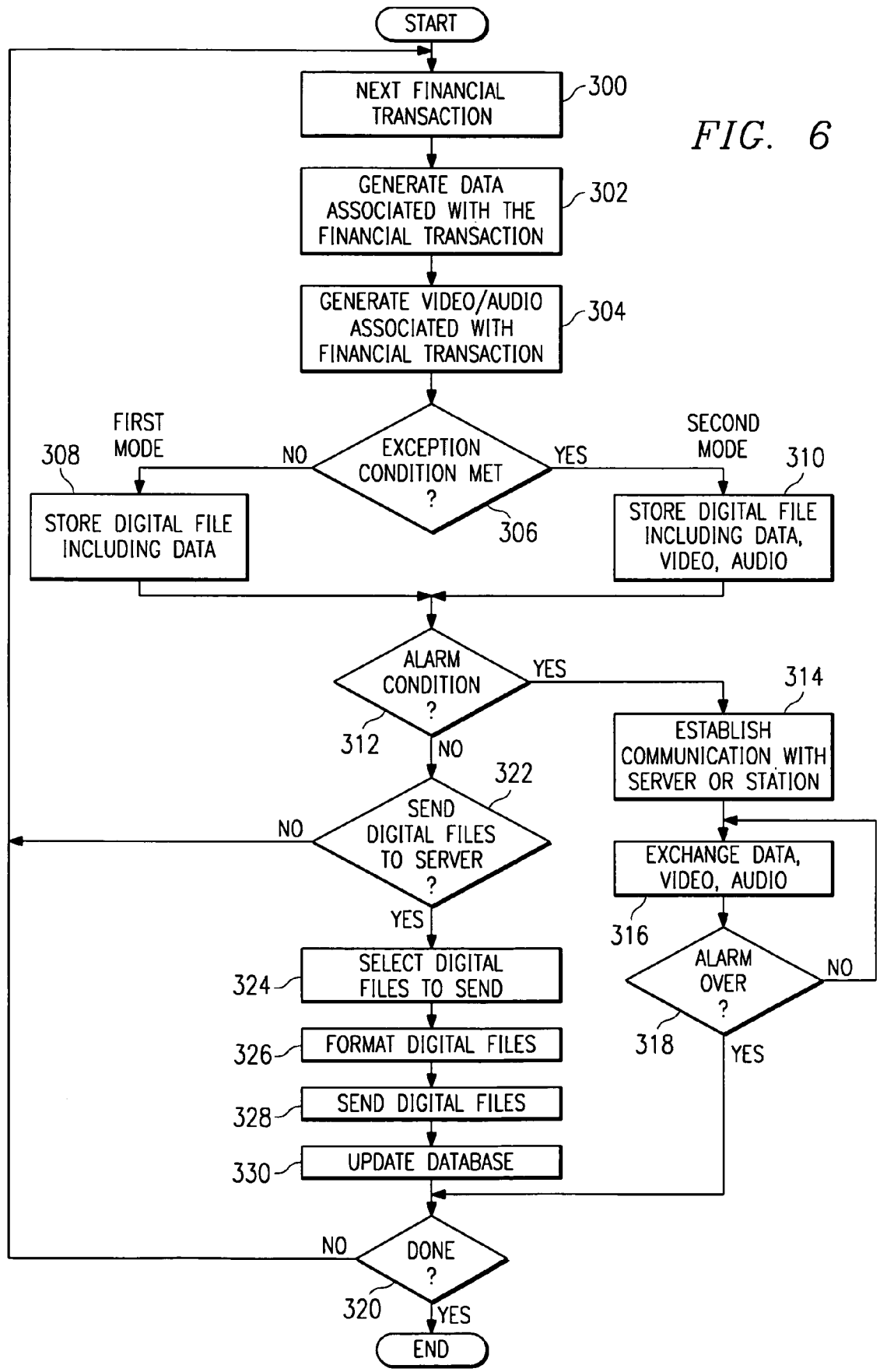
FIG. 6 is a flowchart of a method of operation of the client in the video surveillance system.

FIG. 6 illustrates a flow chart of a method of operation of client 12. The method begins at step 300 where the next financial transaction occurs at ATM 78 or POS 80. ATM 78 or POS 80 generate data 82 associated with and upon the occurrence of the financial transaction at step 302. Continuously, upon the occurrence of the financial transaction at step 300, or at any appropriate time, microphone 52 and cameras 56 generate audio/video information associated with financial transaction at step 304. Throughout this description, the term audio/video refers to video alone, audio alone, or both video and audio. If appropriate, converter 70 may generate video 72 and audio 74 for communication to controller 76.

If controller 76 determines that exception condition 84 stored in database 16 is not met at step 306, client 12 enters a first mode and stores digital file 14 including data 82 in database 16 at step 308. If exception condition 84 is met at step 306, client 12 enters a second mode and stores digital file 14 including data 82, video 72, and optionally audio 74 in database 16 at step 310.

If controller 76 detects alarm condition 85 from alarm 83 at step 312, client 12 establishes communication with server 20 or optionally alarm monitoring station 28 at step 314. While client 12 maintains alarm condition 85, client 12 and server 20 or station 28 exchange data, video, and audio at step 316 to implement a one-way or two-way audio/video conferencing link for remote surveillance, management, or supervision. If alarm condition 85 persists at step 318, client 12 and server 20 or station 28 continue to exchange data 82, video 72, and audio 74 at step 316. If alarm condition 85 is over at step 318 and the operation of client 12 is not done at step 320, the method returns to process the next financial transaction at step 300.

If no alarm condition 85 exists at step 312, client 12 determines whether to send digital files 14 to its associated server 20 at step 322. If digital files 14 are to be sent to server 30, client 12 selects digital files 14 to send at step 324. This may be done in response to a command received from server 20 or by specifying locally by client 12 or remotely by server 20 various parameters, such as time, site identifier, register identifier, or other appropriate parameter to select digital files 14. Controller 76 passes selected digital files 14 to codec 86 for formatting at step 326. Interface 88 using network 24 sends digital files 14 to server 20 at step 328. If appropriate, client 12 updates database 16 at step 330, for example, by deleting digital files 14 transmitted to server 20. If the operation of client 12 is not done at 320 or client 12 determines not to send digital files 14 to server 20 at step 322, the method returns to process the next financial transaction at step 300.

Figure 7:
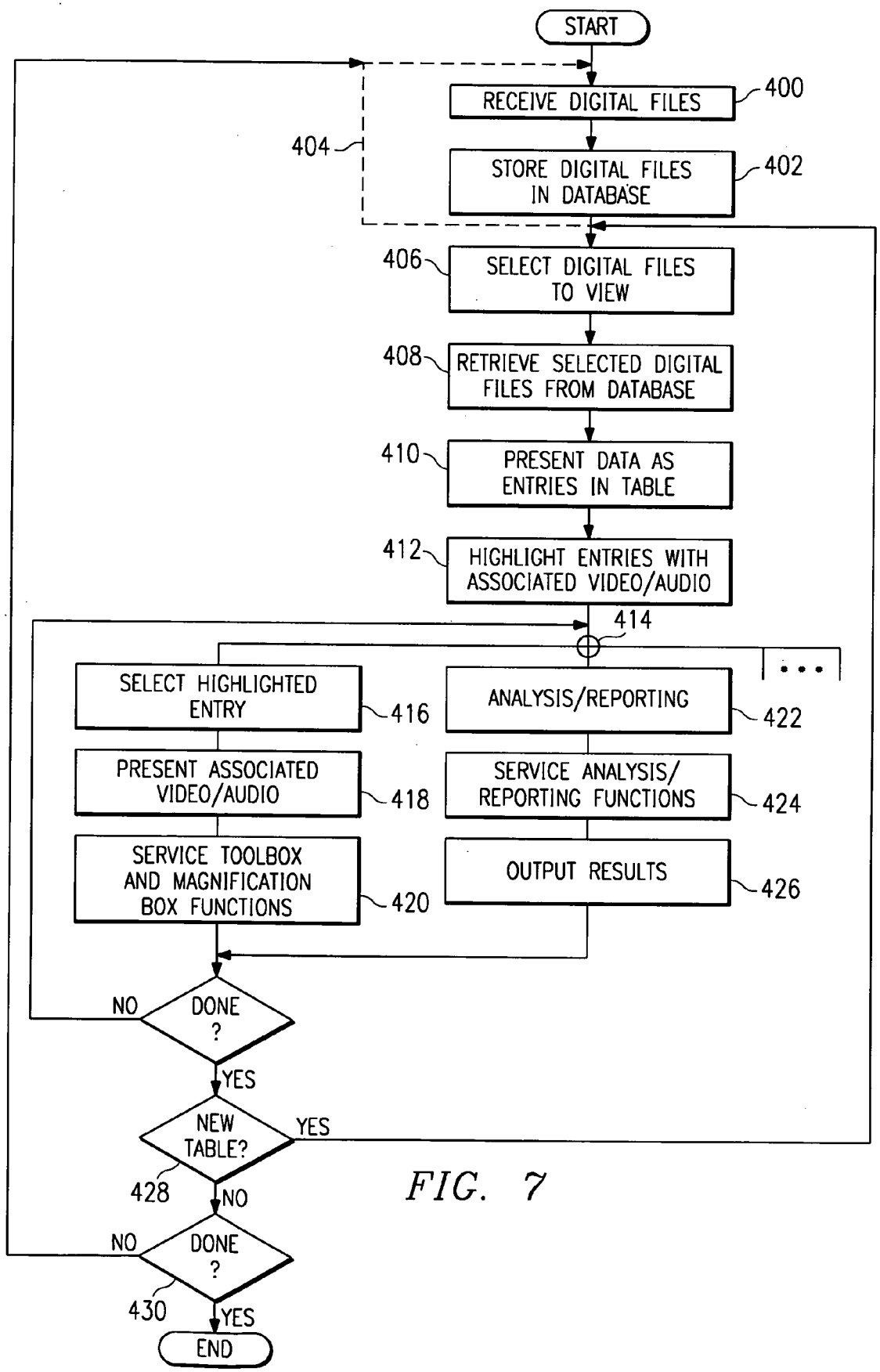
FIG. 7 is a flowchart of a method of operation of the server in the video surveillance system.

FIG. 7 illustrates a flow chart of a method of operation of server 20. The method begins at step 400 where server 20 receives digital files 14 from associated clients 12. Server 20 stores the received digital files 14 in database 18 at step 402. Dashed feedback arrow 404 indicates that steps 400 and 402 may execute in parallel, in series, in the background, or in any other appropriate manner to receive digital files 14 from clients 12.

A user of server 20 may input information into search/report window 132 of graphical interface 116 to select digital files 14 stored in database 18 to view at step 406. In response to the user's request, database management system 114 retrieves selected digital files 14 from database 18 and passes this information to controller 110 at step 408. Graphical interface 116 presents data 82 associated with retrieved digital files 14 as entries 122 and 124 in table 120 at step 410. Graphical interface 116 also highlights particular entries 124 with associated video 72 and optional audio 74 at step 412.

Upon selecting particular digital files 14 from database 18 and presenting entries 122 and 124 in table 120, graphical interface 116 of server 20 supports several user functions as illustrated by branch 414. Graphical interface 116 may support these functions in parallel, in serial, or in any other fashion to allow interaction with the user of server 20. If the user selects highlighted entry 124 at step 416, graphical interface 116 presents associated video 72 and audio 74 in video window 126 at step 418. Graphical interface 116 then services functions of toolbox 128 and magnification box 130 at step 420 to allow further analysis of video 72 and audio 74 associated with the selected highlighted entry 124.

If the user selects an analysis or reporting function at step 422, graphical interface 116 services the analysis and reporting function at step 424. For example, the user of server 20 may request summary statistics, print information, run predefined reports, or perform any other function on data 82 displayed in table 120 or maintained as digital files 14 in database 18. Graphical interface 116 outputs the results of the analysis and reporting functions at step 426.

The user may also request a new table at step 428 by submitting another query in search/report window 132. In response, the method continues at step 406 where server 20 selects digital files 14 to view. If the operation of server 20 is not done at step 430, server 20 continues to receive digital files 14 at step 400 and store digital files 14 in database 18 at step 402.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system, comprising:
   a client operable to perform a financial transaction, the client further operable to generate data from the financial transaction, the client having a camera operable to generate video of the financial transaction, the client operable to store the data and the video in a digital file; and
   a server coupled to the client using a communications network, the server operable to receive the digital file from the client such that the data and the video are associated at the client and may be received at the server as associated with a particular financial transaction;
   the server operable to store the digital file in a first database;
   the server having a graphical interface operable to retrieve data and video from the digital file stored in the first database for presentation; and
   wherein the data and the video are transmitted between the client and the server using a single communication path.

2. The system of claim 1, wherein the client comprises a point-of-sale device and the financial transaction comprises the sale of an item.

3. The system of claim 1, wherein the client comprises an automated teller machine and the financial transaction comprises a cash withdrawal.

4. The system of claim 1, wherein the client comprises a microphone operable to generate audio of the financial transaction, the client operable to store data, video, and audio in the digital file.

5. The system of claim 1, wherein the digital file comprises a single multimedia digital file.

6. The system of claim 1, wherein:
   the graphical interface at the server presents data as an entry in a table having a plurality of entries associated with a plurality of financial transactions; and
   the graphical interface at the server presents video in response to a selection of the entry in the table.

7. The system of claim 1, wherein the graphical interface at the server presents data as an entry in a table having a plurality of entries from a plurality of financial transactions, at least one entry highlighted to indicate the existence of video associated with the entry.

8. The system of claim 1, wherein:
   the client comprises a microphone, a speaker, and a display;
   the server comprises a camera, a microphone, a speaker, and a display; and
   the client and the server are further operable to conduct two-way audio/video conferencing.

9. The system of claim 1, wherein the client has a first mode and a second mode of operation, the client in the first mode includes data in the digital file, the client in the second mode includes data and video in the digital file, the second mode associated with an exception condition of the financial transaction.

10. The system of claim 9, wherein the server transmits information to the client to define the exception condition.

11. A method, comprising:
    generating data from a financial transaction;
    generating video of the financial transaction;
    associating the data and the video at the client;
    storing the data and the video in a digital file at a client;
    receiving the digital file at a server using a communications network, such that the data and the video are transmitted to the server over a single communication path, and the server may associate the digital file with a particular financial transaction;
    storing the digital file at the server; and
    presenting data and video in the digital file using a graphical interface.

12. The method of claim 11, wherein the client comprises a point-of-sale device and the financial transaction comprises the sale of an item.

13. The method of claim 11, wherein the client comprises an automated teller machine and the financial transaction comprises a cash withdrawal.

14. The method of claim 11, further comprising the steps of:
    generating audio of the financial transaction; and
    storing the audio in the digital file at the client.

15. The method of claim 11, wherein the digital file comprises a single multimedia digital file.

16. The method of claim 11, wherein the step of presenting comprises:
    presenting data as an entry in a table having a plurality of entries from a plurality of financial transactions;
    receiving a selection of the entry in the table; and
    presenting video of the data in response to the selection of the entry in the table.

17. The method of claim 11, wherein the step of presenting comprises:
    presenting data as an entry in a table having a plurality of entries from a plurality of financial transactions;
    highlighting the entry to indicate the existence of video of the data; and
    presenting video of the data in response to the selection of the highlighted entry.

18. The method of claim 11, wherein the step of storing data and video at the client comprises:
    storing data in a first mode; and
    storing data and video in a second mode associated with an exception condition of the financial transaction.

19. The method of claim 18, further comprising the step of communicating information from the server to the client to define the exception condition of the financial transaction.

20. The method of claim 18, wherein:
    the client comprises a point-of-sale device and the financial transaction comprises the sale of an item; and
    the exception condition comprises the activation of one of a selected no sale and void keys on the point-of-sale device.

21. The system of claim 1, wherein the server is located remotely from the client.

22. The method of claim 11, wherein the server is located remotely from the client.

23. The system of claim 1, wherein the client further comprises a second database for storing the digital file.

24. The system of claim 1, further comprising a remote server coupled with the client using the communications network and operable to receive the digital file of the financial transaction for remote monitoring of the financial transaction.

25. The method of claim 11, further comprising receiving the digital file at a remote server for remote monitoring of the financial transaction.

* * * * *